US011342866B2

United States Patent
Dickten et al.

(10) Patent No.: US 11,342,866 B2
(45) Date of Patent: May 24, 2022

(54) METHOD FOR OPERATING A PRESSURE CONTROL DEVICE, AND PRESSURE CONTROL DEVICE FOR CARRYING OUT THE METHOD

(71) Applicant: Continental Teves AG & Co. oHG, Frankfurt am Main (DE)

(72) Inventors: Sascha Dickten, Frankfurt am Main (DE); Alexander Kühn, Bensheim (DE); Aleksandar Stanojkovski, Kleinostheim (DE); Robert Schmidt, Kelkheim (DE); Bartosz Maj, Frankfurt (DE)

(73) Assignee: Continental Teves AG & Co. oHG

( * ) Notice: Subject to any disclaimer, the term of this patent is extended or adjusted under 35 U.S.C. 154(b) by 300 days.

(21) Appl. No.: 16/326,445

(22) PCT Filed: Aug. 9, 2017

(86) PCT No.: PCT/EP2017/070179
§ 371 (c)(1),
(2) Date: Feb. 19, 2019

(87) PCT Pub. No.: WO2018/036820
PCT Pub. Date: Mar. 1, 2018

(65) Prior Publication Data
US 2021/0025410 A1    Jan. 28, 2021

(30) Foreign Application Priority Data
Aug. 23, 2016  (DE) .................. 10 2016 215 834.1

(51) Int. Cl.
*H02P 5/68*    (2006.01)
*B60T 13/68*   (2006.01)
(Continued)

(52) U.S. Cl.
CPC ............... *H02P 5/68* (2013.01); *B60T 13/68* (2013.01); *B60T 15/025* (2013.01); *H02P 5/74* (2013.01); *H02P 8/40* (2013.01); *F15B 13/044* (2013.01)

(58) Field of Classification Search
CPC .......... B60T 13/68; B60T 15/025; H02P 5/68; H02P 5/74; H02P 8/40
See application file for complete search history.

(56) References Cited

U.S. PATENT DOCUMENTS 5,991,669 A * 11/1999 Dominke ............... B60R 16/03
                                                701/1
6,373,204 B1 * 4/2002 Peterson .................. H02P 5/74
                                                318/41

(Continued)

FOREIGN PATENT DOCUMENTS

DE       19709317 A1    9/1998
DE   102005048016 A1    4/2007
(Continued)

OTHER PUBLICATIONS

German Search Report for German Application No. 10 2016 215 834.1, with partial translation, dated Nov. 28, 2017—10 pages.
(Continued)

*Primary Examiner* — Kenneth Bomberg
*Assistant Examiner* — Matthew Wiblin
(74) *Attorney, Agent, or Firm* — RatnerPrestia (57) ABSTRACT

A method for operating a pressure control device in a vehicle, in particular in a motor vehicle, wherein current is supplied by an energy source of the vehicle for operating the pressure control device, as a result of which the pressure control device carries out at least one pressure control function, for which at least two actuators of the pressure control device are actuated, wherein at least one current required at maximum for actuating the actuator is deter-
(Continued)

mined for each actuator and current budget management for actuating the actuators and/or for carrying out the pressure control functions is performed by the determined currents required at maximum. In addition, the invention relates to a pressure control device for carrying out the method.

6 Claims, 3 Drawing Sheets

(51) Int. Cl.
*B60T 15/02* (2006.01)
*H02P 5/74* (2006.01)
*H02P 8/40* (2006.01)
*F15B 13/044* (2006.01)

(56) References Cited

U.S. PATENT DOCUMENTS

| | | | | |
|---|---|---|---|---|
| 6,398,320 | B1* | 6/2002 | Nowinski | B60T 7/042 |
| | | | | 303/155 |
| 7,034,502 | B2* | 4/2006 | Bischof | H02J 7/1438 |
| | | | | 320/104 |
| 8,181,358 | B2 | 5/2012 | Isono | |
| 2001/0015630 | A1* | 8/2001 | Shibazaki | H02P 5/68 |
| | | | | 318/34 |
| 2006/0036357 | A1* | 2/2006 | Isono | B60K 6/48 |
| | | | | 701/22 |
| 2011/0234370 | A1 | 9/2011 | Briese et al. | |
| 2014/0265559 | A1* | 9/2014 | Leehey | B60L 58/13 |
| | | | | 307/10.1 |
| 2017/0040915 | A1* | 2/2017 | Krolak | B60L 15/38 |

FOREIGN PATENT DOCUMENTS

| | | |
|---|---|---|
| DE | 102007035904 A1 | 2/2009 |
| DE | 102011083286 A1 | 3/2013 |
| DE | 102013006261 A1 | 10/2014 |
| DE | 102013214732 A1 | 2/2015 |
| EP | 2573430 A1 | 3/2013 |
| KR | 102141322 B1 | 8/2020 |
| WO | 03016097 A1 | 2/2003 |
| WO | 2004026614 A1 | 4/2004 |
| WO | 2004113130 A1 | 12/2004 |

OTHER PUBLICATIONS

International Search Report and Written Opinion for Application No. PCT/EP2017/070179, dated Nov. 3, 2017—8 pages.

* cited by examiner

| LEVEL | AVAILABILITY OF HYDRAULIC FUNCTIONS | MOTOR AVAILABILITY | VALVE AVAILABILITY | COMMENT |
|---|---|---|---|---|
| 0 | Full availability | Full availability | Full availability | All functions can be executed without restriction. |
| 1 | Full availability | Current limiting | Full availability | Relatively low volume delivery dynamics, but full safety provided |
| 1a | Full availability | Current limiting | Special valves sequentially preliminarily switched | Relatively low volume delivery dynamics, but full safety provided |
| 2 | HA: Hydraulically decouple<br><br>VA: Brake force boosting and ABS | Current limiting | HA: Inlet valves switched and held closed by holding current<br><br>VA: Full availability, even with special valves | - Brake force boosting by means of VA<br>- Wheel slip control at VA<br>- Stabilization of HA by hydraulic decoupling |
| 3 | HA: Hydraulically decouple<br><br>VA: ABS control | General: Current limiting<br><br>Zero-current state possible in some instances, depending on the design of the pressure control device | HA: Inlet valves are switched and are held closed by holding current<br><br>VA: All functions available, but not at the same time<br>Special valves: full availability | - ABS at VA<br>- Wheel slip control at VA<br>- Stabilization of HA by hydraulic decoupling |
| 4 | HA: Hydraulically decouple<br><br>VA: Only brake force boosting | General: Current limiting<br><br>Zero-current state also possible, depending on the design of the pressure control device | HA: Inlet valves are switched and are held closed by holding current<br><br>VA: No valve activity, secure valve position only using holding current, possibly no refilling required; secure other valve position only using holding current | - Brake force boosting by means of front axle<br>- Stabilization of HA by hydraulic decoupling<br>- Possibly: refill cycle no longer required |
| 5 | HA: Hydraulically decouple<br><br>VA: Pressure locking function | Depending on the design of the pressure control device: low application of current in order to maintain pressure or no application of current required | HA: Inlet valves are switched and are held closed by holding current, secure other valve position only by holding current<br><br>VA: No activity of the inlet and outlet valves<br>Only isolating valves required; these are closed<br>No refilling required | - Brake force boosting by means of front axle by pressure locking<br>- Stabilization of HA by hydraulic decoupling<br>- Refill cycle possibly no longer required |
| 6 | Hydraulic fallback plane | Zero current | Zero current | Hydraulic fallback plane |

Figure 4

METHOD FOR OPERATING A PRESSURE CONTROL DEVICE, AND PRESSURE CONTROL DEVICE FOR CARRYING OUT THE METHOD

CROSS REFERENCE TO RELATED APPLICATIONS

This application is the U.S. National Phase Application of PCT International Application No. PCT/EP2017/070179, filed Aug. 9, 2017, which claims priority to German Patent Application No. 10 2016 215 834.1, filed Aug. 23, 2016, the contents of such applications being incorporated by reference herein.

FIELD OF THE INVENTION

The invention relates to a method for operating a pressure control device in a vehicle, in particular in a motor vehicle, and to a pressure control device for carrying out the method.

BACKGROUND OF THE INVENTION

In vehicles, the availability of energy for executing functions is limited. Therefore, efforts are being made to reduce energy consumption by the vehicle to an ever greater extent in order to allow the consumption of fuel to be lower. There is therefore the general need for current-saving options.

To date, it has been known to provide fixed limit values for voltage supply in the case of brake systems or air suspension systems. If a function cannot be executed with the voltage supply provided, the function is switched off according to the prior art. As a result, resources are not fully exhausted.

SUMMARY OF THE INVENTION

An aspect of the invention is therefore to utilize the available energy more effectively.

An aspect of the invention presents a method for operating a pressure control device in a vehicle, in particular in a motor vehicle, wherein current is supplied by an energy source of the vehicle in order to operate the pressure control device. As a result of the current supply, at least one pressure control function is carried out by the pressure control device, for which at least two actuators of the pressure control device can be actuated. In addition, at least one current required at maximum in order to actuate the actuator is determined for each actuator and current budget management for actuating the actuators and/or for carrying out the pressure control functions is performed by means of the determined currents required at maximum.

In a preferred development, the pressure control device is embodied as a brake system or an air suspension system. The pressure control device particularly preferably supplies a fluid which can be, in particular, a gas in the case of the air suspension system and a gas or a liquid in the case of the brake system. The pressure control functions, which can therefore be brake pressure control functions or air suspension control operations, have a plurality of associated actuators for executing said functions.

In a preferred development, the at least one actuator is at least one valve and/or one motor, in particular one pump motor. According to the method, a current required at maximum for actuating the actuator is determined for each actuator—for example valve and/or motor—which is assigned to a pressure control function to be taken into consideration or which is required for executing said pressure control function. The required current of all actuators is then preferably added up in order to determine the required current for carrying out the pressure control function in question.

An aspect of the invention has the advantage that improved utilization of the available energy from the energy source is possible by ascertaining the current required at maximum for actuating the actuators or for carrying out the desired pressure control functions. Specifically, intelligent current budget management is possible by virtue of ascertaining the current required at maximum. In this case, said current budget management is not limited to simply switching off functions, but rather allows—preferably by incorporating different parameters—intelligent driving of the consumers, that is to say actuators, so that functions can be executed for longer, even if possibly at reduced power. This firstly ensures longer availability/ability to carry out functions and secondly saves energy which can be made available for other functions for example.

This advantage is, for example, important if the vehicle is intended to be driven autonomously. If it was previously the case that the driver was still available as a monitoring element during braking operations and could therefore also safely brake the vehicle in the event of changeover to a hydraulic or pneumatic fallback plane, it is no longer possible to resort to intervention by the driver as soon as the vehicle is intended to be driven autonomously. Therefore, it is necessary for relevant safety functions to be maintained in every instance, even when there is an insufficient current budget. This is possible with an aspect of the present invention since optimum distribution of the available energy is possible owing to the current budget management.

In one preferred development of an aspect of the invention, ascertaining the current required at maximum is based on present actuation of the actuators. Therefore, it is possible to provide intelligent current budget management for the present moment. If, for example, it is established in a control operation that further execution of the pressure control function is not possible as planned, the function can be interrupted in order to then execute the function, for example, with a redistributed energy supply for the actuators. Therefore, it remains possible to execute safety-related functions.

In a further preferred development of an aspect of the invention, ascertaining the current required at maximum is based on future actuation of the actuators. Therefore, a prediction for the current required at maximum is preferably determined.

Determining the currents required at maximum at a present time particularly preferably takes place alternately with or at the same time as determining the current required at maximum for a future time.

Since "at least one" current required at maximum is intended to be ascertained, in a further preferred embodiment two currents required at maximum, specifically a present and a future maximum current, can also be determined substantially at the same time.

After determining the current required at maximum, a current budget for executing at least one desired pressure control function is particularly preferably established. In this context, establishing a current budget means establishing a current supply excess or a current supply deficit.

In the case of a current supply excess, the function can be executed as planned since there is a sufficient amount of energy for the execution operation. In this case, the current excess is in particular preferably provided for other functions—for example higher functions—by the intelligent current budget management.

In the case of a current budget deficit, the at least one function cannot be executed as planned since there is an insufficient amount of energy for the execution operation. In this case, downgrading of the functions is in particular preferably carried out by the current budget management, so that the safety-related functions can nevertheless be executed with a result which is similar to the desired result—possibly at a reduced speed and/or quality. For this purpose, less relevant functions may not be carried out or the implementation thereof may be stopped. As a result, it is possible to ensure that, in particular, safety-related processes can take place in spite of the current supply deficit. As an alternative or in addition, the energy supply for the actuators can also be redistributed, so that current peaks are avoided. In this way, it is likewise possible for desired pressure control functions to remain executable in spite of the determined deficit.

When the actuator is a valve, the current which is required from the energy source for switching or holding the valve is preferably calculated using the following formula:

$$I_{batt} = I_{coil} \times DC$$

where $I_{batt}$ is the required current of the energy source, $I_{coil}$ is the current which flows through the coil of the valve, and DC is the duty cycle, that is to say the pulse width at which the valve is driven by means of pulse-width modulation. The formula therefore allows the required current of the energy source (for example battery current) to be ascertained without additional electronics components.

In one development of the formula, the required current of the energy source can also be ascertained without incorporating the duty cycle by:

$$I_{batt} = \frac{I_{coil}^2 \times R_{ges}}{U_{ref}}$$

In this case, knowing the coil current ($I_{coil}$), the supply voltage ($U_{ref}$) and the total resistance ($R_{ges}$) is therefore advantageously sufficient in order to determine the current of the energy source (for example battery current).

In one advantageous development, the temperature of the actuator can also be ascertained. For this purpose, the total resistance can be determined:

$$R_{ges} = \frac{U_{ref} \times DC}{I_{coil}}$$

The total resistance $R_{ges}$ of the drive path, which total resistance is determined by the boundary variables (voltage, duty cycle, current measurement), is preferably offset against the known partial resistances in order to filter out the coil resistance. The coil resistance is then used, preferably by comparison with a characteristic curve, in order to ascertain the temperature of the actuator. In this case, the characteristic curve represents a linear relationship between temperature coefficient and resistance at room temperature.

The information relating to the temperature is particularly preferably included in the current budget management in order to take into account the greater current requirement as the valve heats up. Therefore, the component part, here the valve, and/or further components in the valve flow path are advantageously protected and can therefore be taken into account in the total budget in an optimum manner in order to ensure the availability of safety-related functions.

In one preferred development, a worst-case scenario is assumed for predicting the current required at maximum. Therefore, the worst case scenario is used as the basis, so that even this case is covered by the calculation and the function continues to remain fully executable when carrying out the function in this case too.

In one preferred development of an aspect of the invention, the current budget management takes measures to reduce the consumer load and/or to increase the energy which can be supplied. These measures are particularly preferably taken when a current supply deficit has been established by the intelligent current budget management. The current budget management can then either implement an increase in the energy which can be supplied, for example by way of the voltage level of the energy source (or the "on-board electrical system") being raised. As an alternative or in addition (for example at the same time), the consumer load can be reduced. This is done, in particular, by switching off less relevant functions or carrying out the function with less efficiency.

In one preferred development, determining the present maximum currents takes place during the implementation of a pressure control function. When a current supply deficit is established, that is to say it is established that the desired function cannot be actuated with the available energy, while carrying out the pressure control function, that is to say when the control operation is already taking place, the energy is redistributed amongst the required actuators in order to advantageously avoid current peaks for example.

The current budget management can very particularly preferably sequentially make energy available to actuators, in particular for redistributing energy. In this case, the actuators which are required for carrying out the function are alternately supplied with current. This alternating supply with current can take place, for example, between valves and a pump motor. For this purpose, the pump motor may temporarily not be supplied with energy or be supplied with less energy, so that the speed of the motor or the motor torque falls. During this time, the valves are supplied with energy for switching or holding purposes. As a result, the motor operation is not superimposed with the switching currents of the valves and peak currents can be avoided. The budget of the saved current peak (that is to say the remaining budget up to the current limit) can be used in order to temporarily supply additional current for driving the motor. In particular, the valves are first supplied with current, that is to say switched for example, and then energy is supplied to the motor. Therefore, the safety-related driving of the valves is treated as a priority.

Two variants are preferably provided for the sequential preliminary switching of the valves. If only the current consumption peaks have a limiting effect and the degree of heating of the valves allows it, in a first variant the valves are permanently driven or switched, but with utilization of sequential switching with respect to other consumers. That is to say, the valves are initially switched—before other consumers are supplied with energy—and then supplied with a holding current with permanent driving. Only then are other consumers supplied with energy in order to carry out this specific function using said energy. Owing to the distribution of the energy withdrawal from the on-board electrical system over time, current consumption peaks are avoided.

In a second variant, triggering of the sequential preliminary switching is linked to an intention to build up pressure (for example by pedal or motor) in the case of an excessively high degree of heating of the valves or in the case of prespecified limiting of the current peaks and/or of the standby current. That is to say that the actuators are only sequentially driven when, for example, the pedal for a braking operation is fully depressed. When the pressure control operation is complete, the valves are advantageously switched off again, so that the current consumer does not unnecessarily consume energy in the standby mode outside of the pressure control operation.

In one alternative embodiment, the valve can be preliminarily switched in a pressure-free manner for example in order to save energy since less energy is required for switching the valves in the pressure-free state. Therefore, overall, safety-related functions can advantageously be maintained for longer.

In a further preferred development of an aspect of the invention, downgrading profiles for different pressure control scenarios are stored in a memory for the current budget management. The current budget management accesses the different scenarios and initiates corresponding measures. Therefore, the optimum measures which take into account the relevance and the desired safety can be initiated for a specific braking process given a determined current budget. Therefore, amongst other things, current consumption peaks can also be avoided or at least limited.

The worst-case scenario of all required valve functions is particularly preferably included in the profiles. For this purpose, it is ascertained which braking functions require which valve functions, that is to say which valves are used for the various braking scenarios, for creating the profiles. The sum of the required energy for actuating said valve states is then ascertained for each braking scenario, wherein the worst-case scenario is used. In this way, it is possible to ensure that the calculated energy budget and the measure derived therefrom also includes the correct decision for the worst-case scenario.

In one preferred development to this, characteristic curves or gradients are stored in a memory, which characteristic curves or gradients are incorporated into the operation of determining the suitable measures. Characteristic curves for the temperature and the cooling concept of the actuators is in particular preferably stored, so that heating of the actuators is advantageously incorporated into the calculations.

In one further preferred embodiment, a downgrading and drive concept is provided and particularly preferably stored in the controller. If an insufficient amount of energy is available for executing the desired function, in particular braking function, downgrading can take place in several stages or levels in accordance with this stored concept. In the process, the selection of the downgrading or drive level is particularly preferably ascertained by the controller on the basis of the determined current budget, in particular based on the stored profiles. The downgrading and drive concept is used in particular when it is established that execution of a pressure control function desired in the future cannot be presented to the required extent.

In one preferred development of an aspect of the invention, ascertaining the current of the valves presently required due to temperature and environmental conditions takes place by means of a test driving operation. In this case, the test driving operation preferably takes place before a control intervention, during a control operation or after a control operation. However, the test driving operation particularly preferably takes place before and/or during the control operation. As a result, it is possible to advantageously ascertain at an early stage how much current is presently required by the valve for the desired function.

In one further preferred development of an aspect of the invention, the respectively determined current budget is used as a decision criterion for driving the actuators.

BRIEF DESCRIPTION OF THE DRAWINGS

Exemplary embodiments of aspects of the invention will be explained below on the basis of the drawings,
in which:
FIG. 4: shows a table for a hydraulic or pneumatic downgrading and drive concept.

DETAILED DESCRIPTION OF THE PREFERRED EMBODIMENTS

Figure 1:
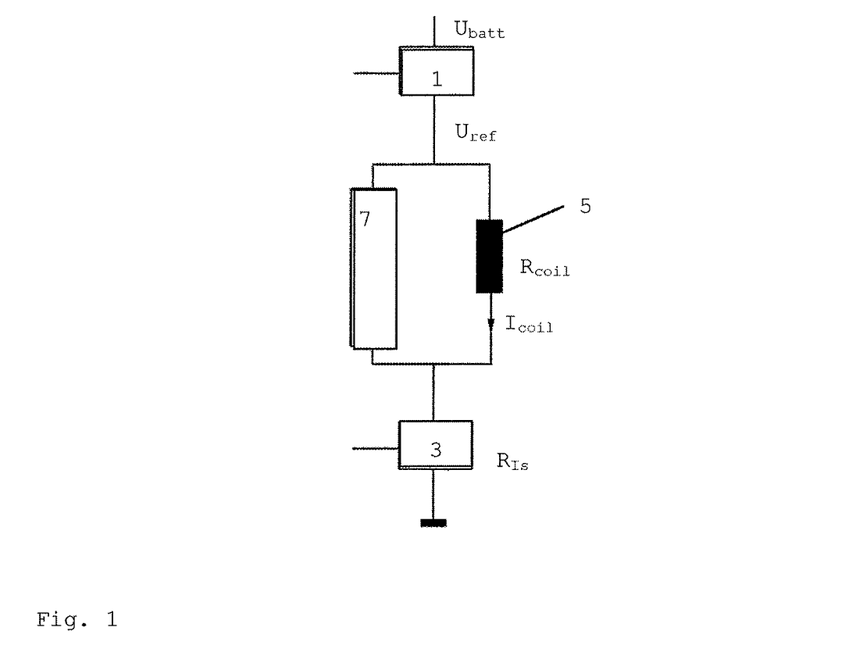
FIG. 1: shows a design of an electronics system for valve control.

FIG. 1 shows the design of an electronics system for valve control in basic and simplified form.

An on-board electrical system voltage $U_{Batt}$ is supplied by an on-board electrical system or a battery. Pulse-width modulation of the voltage is carried out by a high-side driver 1 and a low-side driver 3. A modulated supply voltage $U_{ref}$ is applied between the drivers 1 and 3. As a result, a current flows through the valve coil 5 with coil resistance $R_{coil}$. Owing to the inductance of the coil 5, a current likewise flows through the return circuit 7 during the zero phases of the pulse-width modulation. The average of the current profile over time through the coil 5 is recorded and used as coil current $I_{coil}$ for determining the current required at maximum.

The total resistance $R_{ges}$ of the current path includes the coil resistance $R_{coil}$ and the resistance $R_{Is}$ of the driver stage 3. The temperature can be ascertained by means of the determined coil resistance by comparison with a characteristic curve. The information about the temperature is then advantageously used in order to protect the component part against excessive heating and to determine the correct current requirement of the valve.

Figure 2:
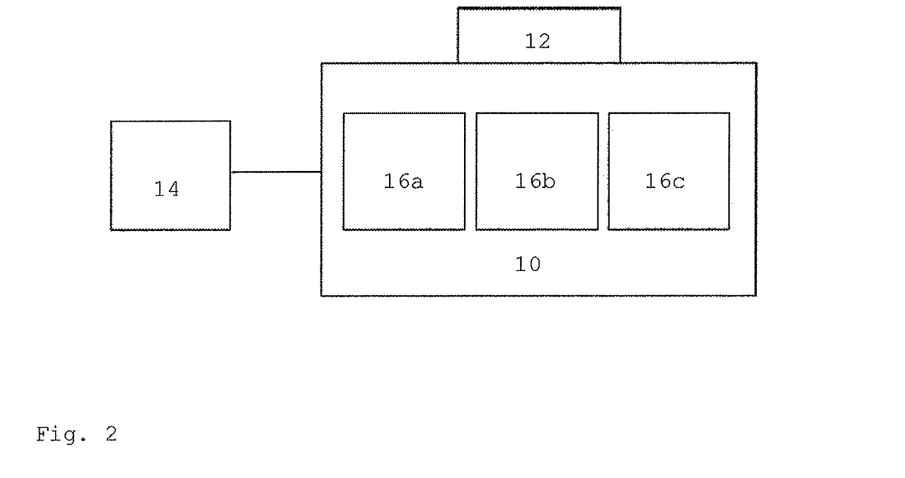
FIG. 2: schematically shows a design with a pressure control device.

FIG. 2 schematically shows a design with a pressure control device 10, an electronic control unit 12 and an energy source 14 for supplying the pressure control device 10 with energy. The pressure control device 10 comprises a plurality of actuators 16a-c, wherein the actuators can be embodied, for example, in each case as a valve or a motor. Three actuators 16a-c are shown by way of example according to FIG. 2; however there may also be only two actuators or more than three actuators in the pressure control device. By way of example, one actuator can be embodied as a pump motor and two or more other actuators can be embodied as valves. The electronic control unit 12 can advantageously have current budget management. Said current budget management can be provided, for example, in the form of software which is run by means of a microprocessor of the control unit 12.

Figure 3:
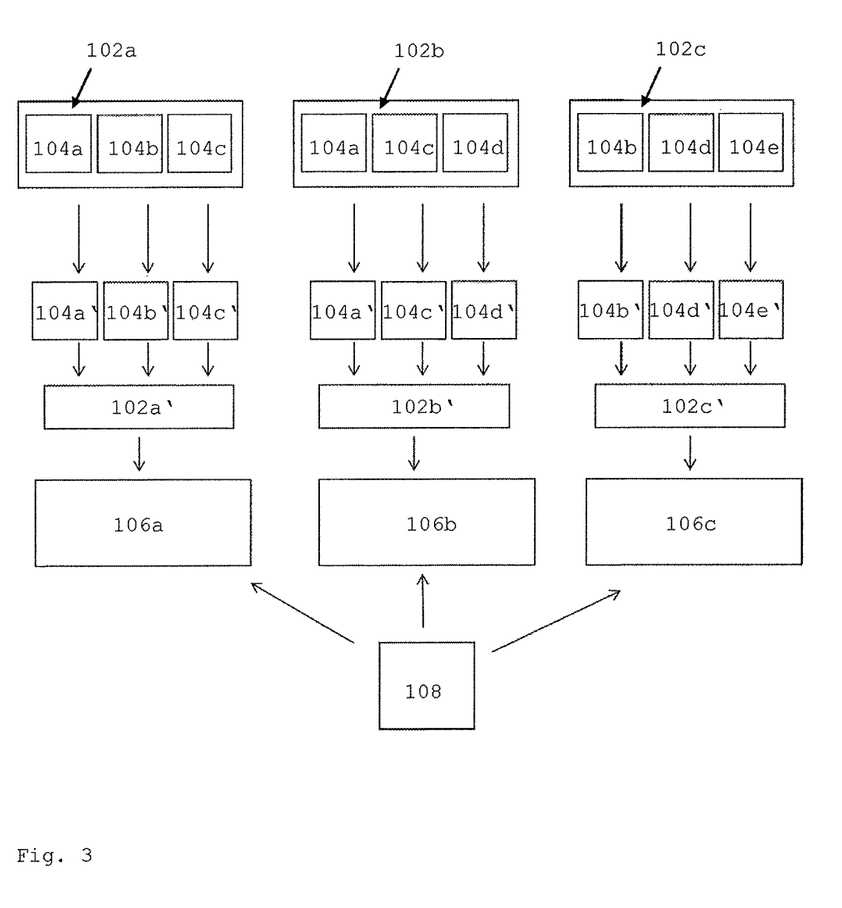
FIG. 3: shows a schematic overview of the sequence of the method according to an aspect of the invention.

FIG. 3 shows a schematic diagram of the method sequence according to an aspect of the invention, wherein the top row with the reference symbols 104 and 102 (without prime) represents the state defined in the pressure control device. Various scenarios, in particular for a braking process or an air suspension control process, in the form of functions (braking functions or pneumatic control functions) 102a-c are defined in the pressure control device. Three functions are shown by way of example here, but more or fewer functions can also be defined. Different actuators are respectively required in order to be able to execute the pressure control functions 102a-c. Actuators 104a-e are shown by way of example here. For example, the actuators 104a-c may be required for the pressure control function 102a, whereas actuators 104b, 104d and 104e are required for executing pressure control function 102c. Therefore, the question of which actuators 104a-e are used for executing the pressure control functions 102a-c is defined in advance.

If, for example, a specific pressure control function is intended to be carried out, for example function 102b, a current 104a', 104c' and 104d' required at maximum is ascertained for the executing actuators 104a, 104c and 104d in line with the method according to an aspect of the invention. This current required at maximum can be ascertained while carrying out the function or before carrying out the function. A total current 102b' required at maximum for carrying out the function 102b is then determined from said currents required at maximum for the individual actuators 104a, 104c and 104d. The intelligent current budget management then ascertains a current budget 106b with the aid of knowing the energy 108 which can be supplied at maximum (for example by a battery). In this case, it is also determined whether there is a current supply excess or a current supply deficit. If a current supply deficit is established, this information is then used in order to carry out measures for reducing the load by the actuators or measures for increasing the energy which can be supplied. If a current supply excess is established however, the excess unrequired energy is advantageously made available to other functions, for example higher functions.

The reference symbols with a prime each denote currents required at maximum. In this case, the reference symbols 104a'-104e' denote the current respectively required at maximum by the respective actuator 104a-104e. The reference symbols 102a', 102b' and 102c' each denote the current required at maximum for the associated function 102a-102c, which current is ascertained from the currents 104a'-104e' required at maximum of the respectively associated actuators 104a-104e. 106a-c denote the determined current budget for carrying out the associated functions 102a-c.

In this case, the currents 104a'-e' required at maximum are either based on a present time or a future time. It is possible to obtain the currents required at maximum for a present time and also a future time by carrying out the method a second time.

A worst-case scenario is preferably assumed for the currents 104a'-e' required at maximum—in particular when ascertained based on a future time. That is to say that, for example, the highest possible temperature of the valve based on the future time is assumed. This highest possible temperature is preferably introduced into the calculation by means of characteristic curves. Therefore, the worst-case scenario is the basis for the further calculations, so that a decision which ensures maximum safety—in particular of a braking process—can be made by the current budget management.

A measure for reducing the required current 104a'-e' is preferably performed by downgrading functions. That is to say that a plurality of functions which are desired at the same time are carried out in accordance with their priority in respect of safety. In this case, for example, less relevant functions 102a-102c are not carried out at all or are carried out only partially. As an alternative, the desired function, for example 102a, is not carried out but rather another function, for example 102b, with a similar result but lower energy requirement is carried out.

If a control operation is already taking place while establishing the current supply deficit, the available energy 108 is preferably redistributed amongst the actuators 104a-e which are required for executing the function 102a-102c. By way of example, redistribution of the energy amongst the actuators 104a, 104c and 104d of the function 102b can therefore take place. In this case, a measure for reducing the required current 104a'-e' may be, for example, sequentially driving the associated actuators 104a-e when carrying out the function 102a-c as desired. If, for example, the function 102a is intended to be carried out, the actuators 104a-c are then supplied with current one after the other. By way of example, the actuators 104a and 104b can be embodied as valves. Actuator 104c could be embodied as a motor. By means of sequential preliminary switching, the valves 104a and 104b are then initially switched and the motor 104c is only then supplied with energy. As a result, current peaks can advantageously be avoided.

For the measures for reducing the currents required at maximum, either downgrading of pressure control functions is advantageously carried out—in particular when determining the currents required at maximum for a future time (future maximum currents) and the desired implementation of a plurality of pressure control functions—or redistribution of the energy amongst the actuators is provided—in particular when determining the currents required at maximum while carrying out a pressure control function (present maximum currents). As an alternative, redistribution of energy amongst the actuators is likewise performed if only one pressure control function is intended to be executed at the same time and when determining the future maximum current for carrying out this function.

FIG. 4 shows a table for a possible downgrading and drive concept which can be used for reducing the load by the actuators. As an alternative or in addition, profiles for various scenarios (not shown) can be stored for the current budget management.

Here, the possible downgrading and drive concept is shown, by way of example, with eight different downgrading levels (levels 0 to 6, including level 1a). In this case, the downgrading spectrum ranges from full availability of all functions (level 0) up to changeover to the hydraulic fallback plane (level 6). Possible gradings are shown between level 0 and level 6. Here, the possible state of the motor and the valves is noted in each case. Dynamic changeovers can preferably be made between the individual downgrading stages (or levels).

In respect of driving of the pump and/or of the pump motor, the availability of these actuators is given greater priority than the ability to actuate high pressure gradients. The permitted current consumption has a direct influence on the possible maximum pressure or the required actuating time for the pressures.

As a development according to an aspect of the invention, a new function is noted at level 5. The "pressure locking function" noted there is distinguished by a very low current requirement but great benefits in respect of brake force assistance. In this case, the pressure is locked in the fluid system in which output and input valves and the separate valves, for example disconnecting valves, are closed. Therefore, braking is at least still possible with the existing pressure in the system even if no energy for opening the output valves can be supplied. In order to release the pressure in the case of this function, the pressure release criterion is coupled to the driver request detection or the vehicle speed and executed as soon as a sufficient amount of energy is available again.

Current budget and current requirement can serve as criteria for selecting the downgrading level. As an alternative or in addition, the downgrading level can also be ascertained on the basis of the remaining brake fluid volume. For this purpose, the requirement of the refill cycle (replenishment circuit for the brake fluid) may be taken into account.

In FIG. 4, all valves which are not inlet or outlet valves are denoted special valves. A special valve is therefore preferably a valve which is arranged between a brake pedal-operable master cylinder and the inlet valve or a valve which is arranged between an electrically controllable pressure source and the inlet valve.

In FIG. 4, the abbreviation HA is selected for denoting the rear axle and the designation VA is selected for the front axle. It is critical in respect of safety that there is never more brake pressure applied to the rear axle than the front axle. Therefore, the rear axle and the front axle are sometimes noted separately from one another with different measures in FIG. 4. In this case, hydraulic decoupling is provided as a measure on the rear axle in accordance with several levels. In this case, there is no pressure build-up or only little pressure build-up at the rear axle, so that braking is effected substantially with the wheels of the front axle. As a result, the rear axle is stabilized.

According to level 0, all functions are available without restriction and can be executed without restriction. Said level is preferably selected when no restriction in the energy supply is identified.

According to level 1, current limiting of the motor takes place, so that a smaller volume delivery takes place at the motor. Nevertheless, all safety-related functions can be executed without restriction—for example by driving the valves—in this level.

According to level 1a, sequential preliminary switching of the valves takes place in addition to current limiting of the motor. In this case, the valves are initially switched and energy is only then supplied for the motor. As a result, energy supply of valves and motor does not take place at the same time, so that current peaks are avoided. All safety-related functions can be carried out without restriction here too.

According to level 2, energy for brake force boosting and ABS control is provided at the front axle. However, the rear axle is hydraulically decoupled, so that no build-up of pressure takes place there. The inlet valves at the rear axle therefore remain in the switched state and are held closed by a holding current. As a result, energy can be saved since the holding current has a lower energy requirement than a switching current. In particular, activation of the outlet valves which have a very high energy requirement for the switching process is not required. However, the valves at the front axle are switched without restriction as required. The special valves are also fully available. As a result, wheel slip control can advantageously still take place at the front axle.

According to level 3, only ABS control is carried out at the front axle. Depending on the design of the pressure control device and/or of the pump or of the pump motor, the pump motor is switched to a zero-current state. At the front axle, the valves are not switched at the same time but rather sequentially, in order to avoid current peaks.

According to level 4, only brake force boosting takes place at the front axle. ABS control is no longer carried out.

At the front axle, either only one activity of the special valves is necessary or no valve activity at all is necessary. Depending on the design of the pressure control device, no refill cycle (replenishing cycle for the hydraulic fluid) is now necessary here and can be omitted.

According to level 5, the valves at the front axle are in the pressure locking function. In this case, the special valves are closed, so that braking is possible only with the volume currently present in the brake hose.

According to level 6, neither the motor nor the valves are supplied with current, so that recourse is made to the hydraulic fallback plane of the vehicle. This level is preferably selected when there is no energy for executing functions of the higher levels.

The invention claimed is:

1. A method for operating a pressure control device in a vehicle, the method comprising:
   supplying energy by an energy source of the vehicle in order to operate the pressure control device, as a result of which the pressure control device carries out at least one pressure control function, for which at least two actuators of the pressure control device are actuated,
   determining a maximum current required in order to actuate each actuator and determining a current budget management for actuating the at least two actuators for carrying out the at least one pressure control function with the determined maximum currents required and knowing energy which can be provided at maximum by the energy source, such that either a current supply excess or a current supply deficit is established, wherein the determining the maximum current required takes place at a present time during the carrying out of the at least one pressure control function and
   determining a future maximum current required in order to actuate each actuator and determining a future current budget management for actuating the at least two actuators for carrying out the at least one pressure control function with the determined future maximum currents required and knowing the energy which can be provided at maximum by the energy source, such that either a future current supply excess or a future current supply deficit is established, wherein the determining the future maximum current required takes place for a future time,
   wherein measures for reducing the maximum currents required and/or measures for increasing the supplied energy are carried out for the current budget management, and measures for reducing the future maximum currents required and/or measures for increasing future supplied energy are carried out for the future current budget management, and
   wherein the measures for reducing the future maximum currents required include downgrading at least one future pressure control function based on the determination that there is the future current supply deficit.

2. The method as claimed in claim 1, wherein the determining the future maximum currents required takes place for different pre-specified pressure control functions of the at least one pressure future control function and the pre-specified pressure control function with the highest current budget management is the at least one future pressure control function downgraded.

3. The method as claimed in claim 1, wherein the measures for reducing the maximum currents required further include changing a distribution of the energy between the at least two actuators during carrying out one of the at least one pressure control function.

4. The method as claimed in claim 3, further comprising driving the at least two actuators sequentially for changing the distribution of the energy when the current supply deficit is established.

5. The method as claimed in claim 1, wherein a temperature of each actuator of the at least two actuators is determined and the temperatures increasing or decreasing a respective maximum current required when determining the current budget management of the at least one pressure control function.

6. The pressure control device for operation in the vehicle, wherein the pressure control device is designed in such a way as to carry out the method as claimed in claim 1.

* * * * *